United States Patent
Asaka (10) Patent No.: US 10,530,968 B2
(45) Date of Patent: Jan. 7, 2020

(54) IMAGE READING APPARATUS AND IMAGE READING METHOD

(71) Applicants: KABUSHIKI KAISHA TOSHIBA, Tokyo (JP); TOSHIBA TEC KABUSHIKI KAISHA, Tokyo (JP)

(72) Inventor: Satomi Asaka, Yokohama Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/941,814

(22) Filed: Mar. 30, 2018

(65) Prior Publication Data
US 2019/0306374 A1   Oct. 3, 2019

(51) Int. Cl.
*H04N 1/00* (2006.01)
*H04N 1/60* (2006.01)
*H04N 1/48* (2006.01)

(52) U.S. Cl.
CPC ......... *H04N 1/603* (2013.01); *H04N 1/00816* (2013.01); *H04N 1/00819* (2013.01); *H04N 1/486* (2013.01)

(58) Field of Classification Search
CPC ............... H04N 1/603; H04N 1/00816; H04N 1/00819; H04N 1/486
USPC ........................................................ 358/504
See application file for complete search history.

(56) References Cited

U.S. PATENT DOCUMENTS

| | | | | |
|---|---|---|---|---|
| 5,198,909 A | * | 3/1993 | Ogiwara | H04N 1/02875 358/412 |
| 5,264,948 A | * | 11/1993 | Imoto | H04N 1/0464 355/55 |
| 5,627,649 A | * | 5/1997 | Sawayama | B41J 2/473 358/296 |
| 6,388,694 B1 | * | 5/2002 | Fujita | G06K 15/1252 347/236 |
| 6,426,776 B1 | * | 7/2002 | Ochi | H04N 1/00 348/203 |
| 2001/0033395 A1 | * | 10/2001 | Chizawa | H04N 1/6027 358/461 |
| 2003/0053157 A1 | * | 3/2003 | Sakakibara | H04N 1/407 358/514 |

(Continued)

FOREIGN PATENT DOCUMENTS

JP  2007-124144 A  5/2007
JP  2013-005176 A  1/2013

*Primary Examiner* — Allen H Nguyen
(74) *Attorney, Agent, or Firm* — Kim & Stewart LLP (57) ABSTRACT

An image reading apparatus comprises a light source for repeatedly emitting first light having a first color, second light having a second color and third light having a third color toward a read target while moving the light source in a sub-scanning direction, first, second, and third sensors, each configured to sense a strength of first, second, and third reflected light, respectively, in a light reflected from the read target, and to output first, second, and third signal waveforms corresponding to the strength of the first, second, and third reflected light, respectively, and a controller. The controller is configured to execute a line-to-line correction for correcting a phase shift between the first, second, and third signal waveforms, and to correct a shift in a signal level caused by the line-to-line correction.

12 Claims, 10 Drawing Sheets

R: SIGNAL INDICATING STRENGTH OF RED LIGHT
G: SIGNAL INDICATING STRENGTH OF GREEN LIGHT
B: SIGNAL INDICATING STRENGTH OF BLUE LIGHT

R': SIGNAL INDICATING STRENGTH OF RED LIGHT AFTER CORRECTION
G': SIGNAL INDICATING STRENGTH OF GREEN LIGHT AFTER CORRECTION
B': SIGNAL INDICATING STRENGTH OF BLUE LIGHT AFTER CORRECTION

(56) References Cited

U.S. PATENT DOCUMENTS

2008/0186518 A1\* 8/2008 Shoda .................... H04N 1/486
　　　　　　　　　　　　　　　　　　　　　　358/1.9
2009/0135243 A1 5/2009 Yamazaki \* cited by examiner

| OPERATION NUMBER | RED STRENGTH | GREEN STRENGTH | BLUE STRENGTH |
|---|---|---|---|
| ⋮ | ⋮ | ⋮ | ⋮ |
| 4 | 20 | 48 | 110 |
| 5 | 170 | 180 | 192 |
| 6 | 208 | 208 | 208 |
| 7 | 208 | 208 | 208 |
| 8 | 200 | 200 | 200 |
| 9 | 175 | 112 | 48 |
| 10 | 32 | 16 | 16 |
| 11 | 16 | 16 | 16 |
| ⋮ | ⋮ | ⋮ | ⋮ |

IMAGE READING APPARATUS AND IMAGE READING METHOD

FIELD

Embodiments described herein relate generally to an image reading apparatus and an image reading method.

BACKGROUND

A conventional image reading apparatus reads an image on a sheet by acquiring reflected light when light of each color including red, green and blue is irradiated by a light source onto a read target, such as a sheet. In this case, the light source moves in a sub-scanning direction and sequentially switches among red, green and blue light to emit the light of different color to the sheet at different times. Since the light source moves in the sub-scanning direction during the switching, light of different color is irradiated onto different positions of the sheet. For this reason, instead of reading an image with the red, green and blue light overlapped with each other, the image is read with color shifting. In view of such a problem, there is a method of converting the acquired reflected light to an electric signal indicating a strength of the reflected light, and correcting a phase of the electric signal. By correcting the phase of the electric signal, the color shift is corrected, and an image that is close to the image that is read when the red, green and blue light is emitted to the same position on the sheet, can be acquired. However, in the conventional method, although the image read by the image reading apparatus is an image in which the color shift is corrected, there is a case in which a color of the image is changed. The change of color refers to that a color of the image read by the image reading apparatus is different from the color of the read target.

DETAILED DESCRIPTION

In accordance with an embodiment, an image reading apparatus comprises a light source, an acquisition section, a first correction section, and a second correction section. The light source configured to repeatedly emit first light having a first color, second light having a second color and third light having a third color at different times toward a read target while moving the light source in a first direction, first, second, and third sensors, each configured to sense a strength of first, second, and third reflected light, respectively, in a light reflected from the read target, and to output first, second, and third signal waveforms, respectively, the first signal waveform corresponding to the strength of the first reflected light sensed by the first sensor, the second signal waveform corresponding to the strength of the second reflected light sensed by the second sensor, and the third signal waveform corresponding to the strength of the third reflected light sensed by the third sensor, and a controller. The controller is configured to execute a line-to-line correction for correcting a phase shift between the first, second, and third signal waveforms, and to correct a shift in a signal level caused by the line-to-line correction.

Hereinafter, an image reading apparatus and an image reading method of an embodiment are described with reference to the accompanying drawings.

Figure 1:
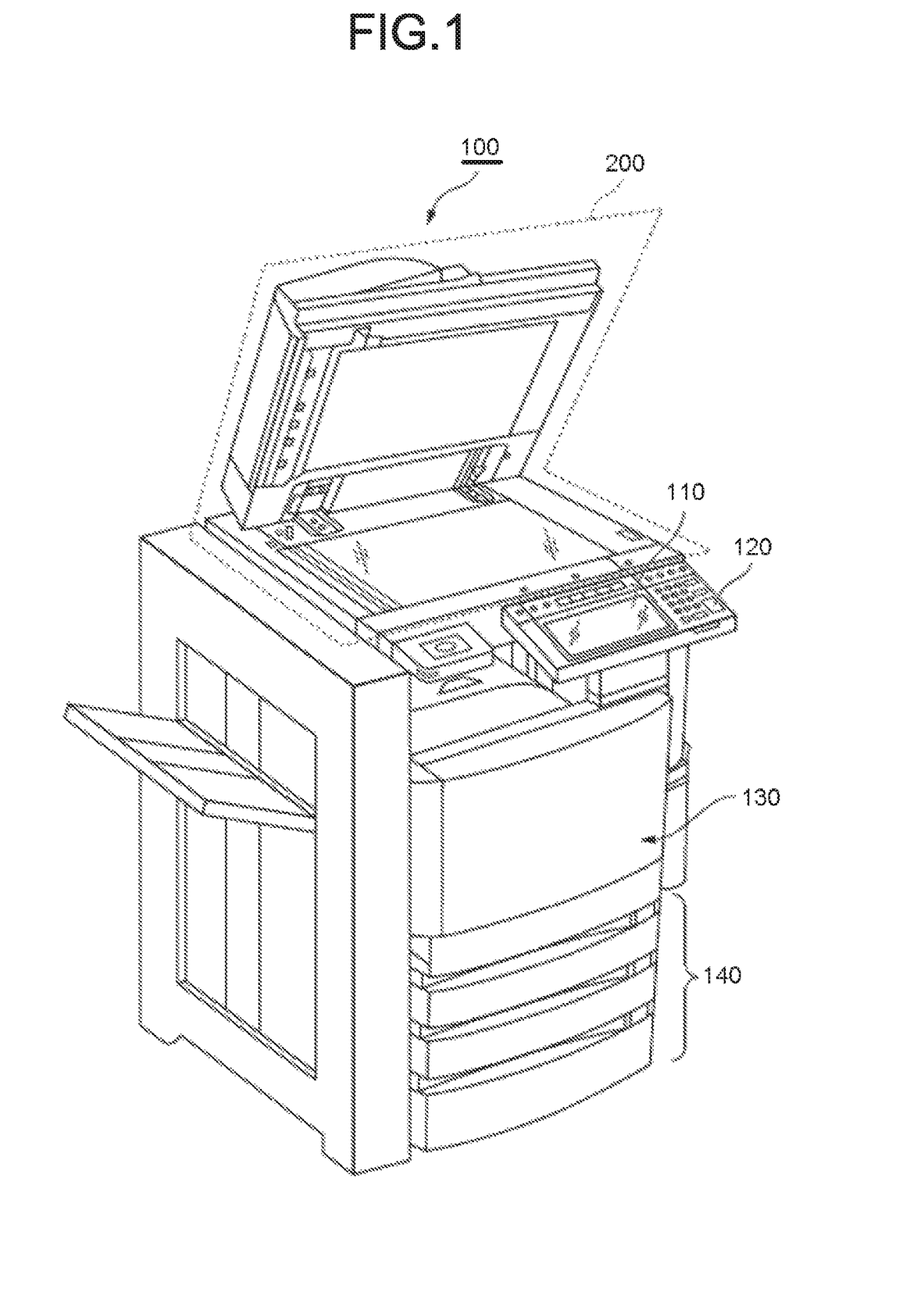
FIG. 1 is an external view of an image reading apparatus according to an embodiment.

FIG. 1 is an external diagram exemplifying the entire configuration of an image reading apparatus 100 according to the embodiment. The image reading apparatus 100 is, for example, an image forming apparatus such as a multi-functional peripheral. The image reading apparatus 100 is provided with a display 110, a control panel 120, a printer section 130, a sheet housing section 140 and an image reading section 200. The printer section 130 of the image reading apparatus 100 may be a device that performs printing by fixing a toner image or an inkjet type printing device.

The image reading apparatus 100 reads an image displayed on a sheet and generates digital data to generate an image file. The sheet is, for example, an original document and a paper on which characters or images are recorded. Instead of a sheet, other objects may be the read target as long as it can be read by the image reading apparatus 100. In the present embodiment, for the purpose of simplicity, it is assumed that the image reading apparatus 100 reads the image on the sheet as a gray scale image.

The display 110 is an image display device such as a liquid crystal display, an organic EL (electro luminescence) display or the like. The display 110 displays various kinds of information relating to the image reading apparatus 100.

The control panel 120 has a plurality of buttons. The control panel 120 receives an operation by a user. The control panel 120 outputs a signal in response to an operation carried out by the user to a controller of the image reading apparatus 100. The control panel 120 and the display 110 are integrated as a touch panel.

The printer section 130 forms an image on a sheet according to image information generated by the image reading section 200 or image information received via a communication path. The printer section 130 forms an image through, for example, the following process. An image forming section of the printer section 130 forms an electrostatic latent image on a photoconductive drum based on the image information. The image forming section of the printer section 130 attaches a developing agent to the electrostatic latent image to form a visible image. A toner is an example of the developing agent. A transfer section of the printer section 130 transfers the visible image onto the sheet.

A fixing section of the printer section 130 heats and pressurizes the sheet to fix the visible image on the sheet. The sheet on which an image is formed may be a sheet accommodated in the sheet housing section 140 or a manually fed sheet.

The sheet housing section 140 accommodates the sheet used for the image formation carried out by the printer section 130.

The image reading section 200 reads the image information from a read target as intensity of light. The image reading section 200 records the read image information. The recorded image information may be sent to other image processing apparatus via a network. The recorded image information may be used to form an image on the sheet by the printer section 130.

Figure 2:
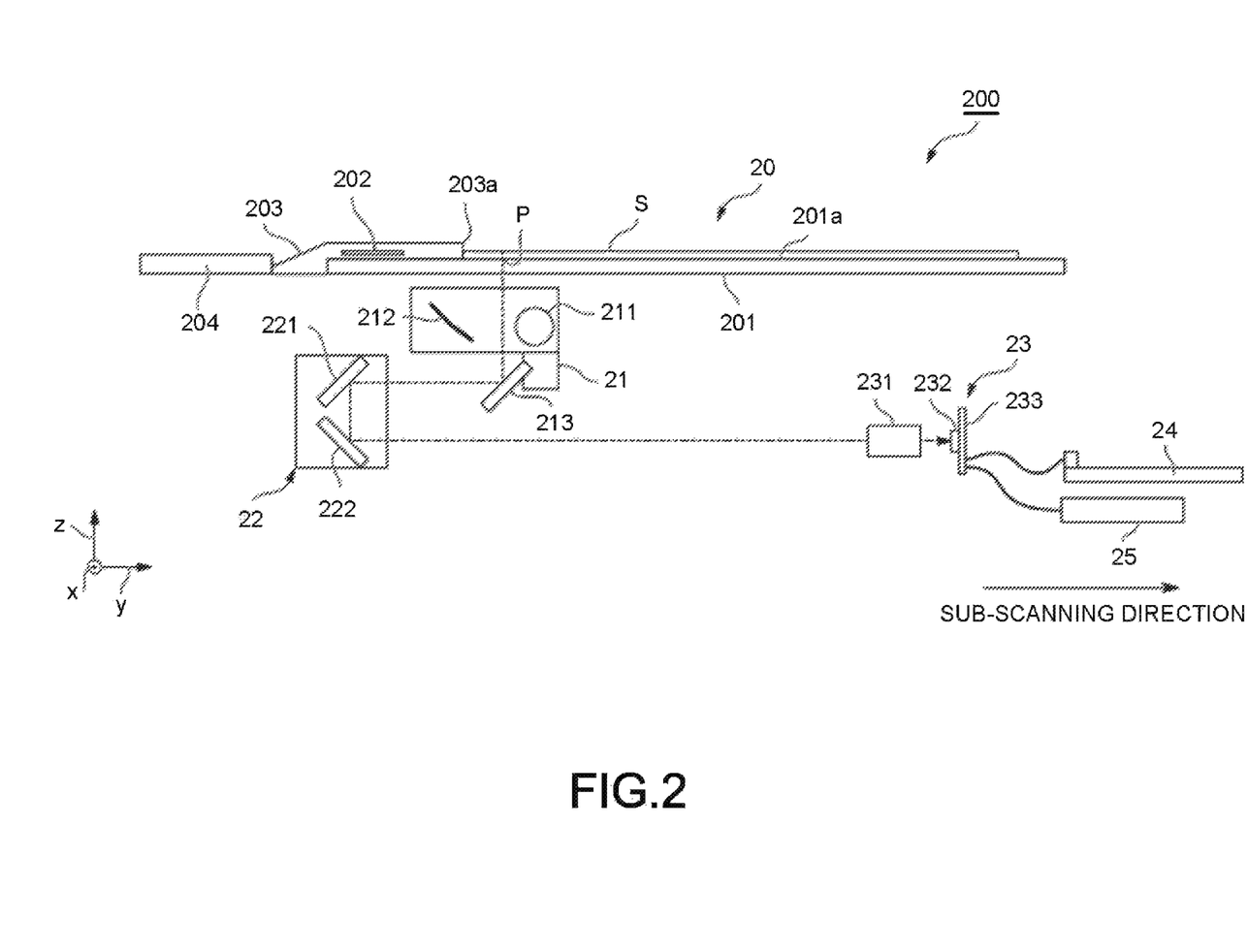
FIG. 2 is a schematic diagram of different elements of an image reading section of the image reading apparatus.

FIG. 2 is a schematic diagram of different elements of the image reading section 200.

The image reading section 200 is provided with a document table 20, a first carriage 21, a second carriage 22, an image capturing section 23, an operation controller 24 and a signal processing section 25. The document table 20 may be a part of an ADF (Automatic Document Feeder). A direction in which the first carriage 21 moves is a sub-scanning direction Y. In the document table 20, a direction orthogonal to the sub-scanning direction Y is a main scanning direction X. A direction orthogonal to the main scanning direction X and the sub-scanning direction Y is a height direction Z.

The document table 20 includes a document table glass 201, a shading plate 202, a document scale 203 and a transparent glass 204.

The document table glass 201 has a placing surface 201a on which a sheet S is placed. The shading plate 202 includes a member with a reference color by which shading correction is carried out on an image read (hereinafter, referred to as a "read image") from the sheet S. For example, the shading plate 202 has white color. The shading plate 202 is rectangular and has long sides in the main scanning direction X. The document scale 203 indicates a position of the sheet S placed on the document table glass 201. A tip reference section 203a is arranged at an end of the document scale 203. The tip reference section 203a is formed with a difference in height with respect to the placing surface 201a of the document table glass 201 to form a convex portion against which the end of the sheet S is pressed. The sheet S is pressed against the tip reference section 203a on the document table glass 201 and thus a position thereof is determined. A position at which corners of tips of the sheet S are to be placed is thus predetermined on the placing surface 201a. Accordingly, the positions in the main scanning direction X and the sub-scanning direction Y are determined by placing the corners of the tips of the sheet S at the predetermined positions.

The first carriage 21 is provided with a light source 211, a reflector 212 and a first mirror 213.

The light source 211 emits the light of each color including red (R), green (G) and blue (B) at a predetermined time interval dt in the order of red, green and blue. For example, the light source 211 emitting the red light at a time t0 emits the green light at a time t1 which is a time dt later than the time t0. The light source 211 emitting the green light at the time t1 emits the blue light at a time t2 which is the time dt later than the time t1. Furthermore, at a time t2, the light source 211 emitting the blue light emits the red light at a time t3 which is the time dt later than the time t2. The time t0, t1, t2, t3 and dt have the following relationship: t1=t0+dt, t2=t1+dt=t0+2*dt, and t3=t0+3*dt. The light source 211 repeats the operations performed from t0 to t3 after the time t3. Below, the operation of the light source 211 from emission of the red light to emission of the blue light is referred to as a unit operation. The time required by one unit operation is a fixed time of t3-t0. Below, among the unit operations performed after the predetermined time, which is for example a time at which the light source 211 is energized to start operating, the unit operation of Nth time is referred to as a unit operation N.

The reflector 212 reflects the light emitted from the light source 211. The light reflected by the reflector 212 is emitted to the shading plate 202 and the sheet S uniformly. Light distribution characteristics in the main scanning direction X at a reading position in the sub-scanning direction of the sheet S are adjusted based on the reflected light of the emitted light. The first mirror 213 reflects the light reflected by the shading plate 202 and the sheet S towards a second mirror 221 of the second carriage 22.

The second carriage 22 is provided with the second mirror 221 and a third mirror 222. The second mirror 221 reflects the light reflected by the first mirror 213 towards the third mirror 222. The third mirror 222 reflects the light reflected by the second mirror 221 to a condenser lens 231 of the image capturing section 23.

The image capturing section 23 is provided with the condenser lens 231, a CCD (Charge Coupled Device) sensor 232 and a CCD substrate 233. The condenser lens 231 condenses the light reflected by the third mirror 222. The condenser lens 231 directs the condensed light to be imaged on an imaging plane of the CCD sensor 232. The CCD sensor 232 is installed on the CCD substrate 233. The CCD sensor 232 includes, for example, three line sensors for reading a color image. The line sensor is a sensor in which a plurality of CCDs is arranged in a row in the main scanning direction. In the present embodiment, the CCDs are arranged in an X-axis direction in FIG. 2. The line sensor outputs a signal indicating strength of the light received by each CCD. The CCD sensor 232 reads R (red) light, G (green) light and B (blue) light. The CCD sensor 232 converts the light imaged by the condenser lens 231 into an electric charge. Through the conversion, the CCD sensor 232 converts an image formed by the condenser lens 231 to an electrical signal. The CCD substrate 233 converts the electrical signal generated by a photoelectric conversion of the CCD sensor 232 to a digital signal. The CCD substrate 233 outputs the generated digital signal to the signal processing section 25. The foregoing processing carried out by the CCD substrate 233 is executed by an AFE (Analog Front End) circuit installed on the CCD substrate 233.

Figure 3:
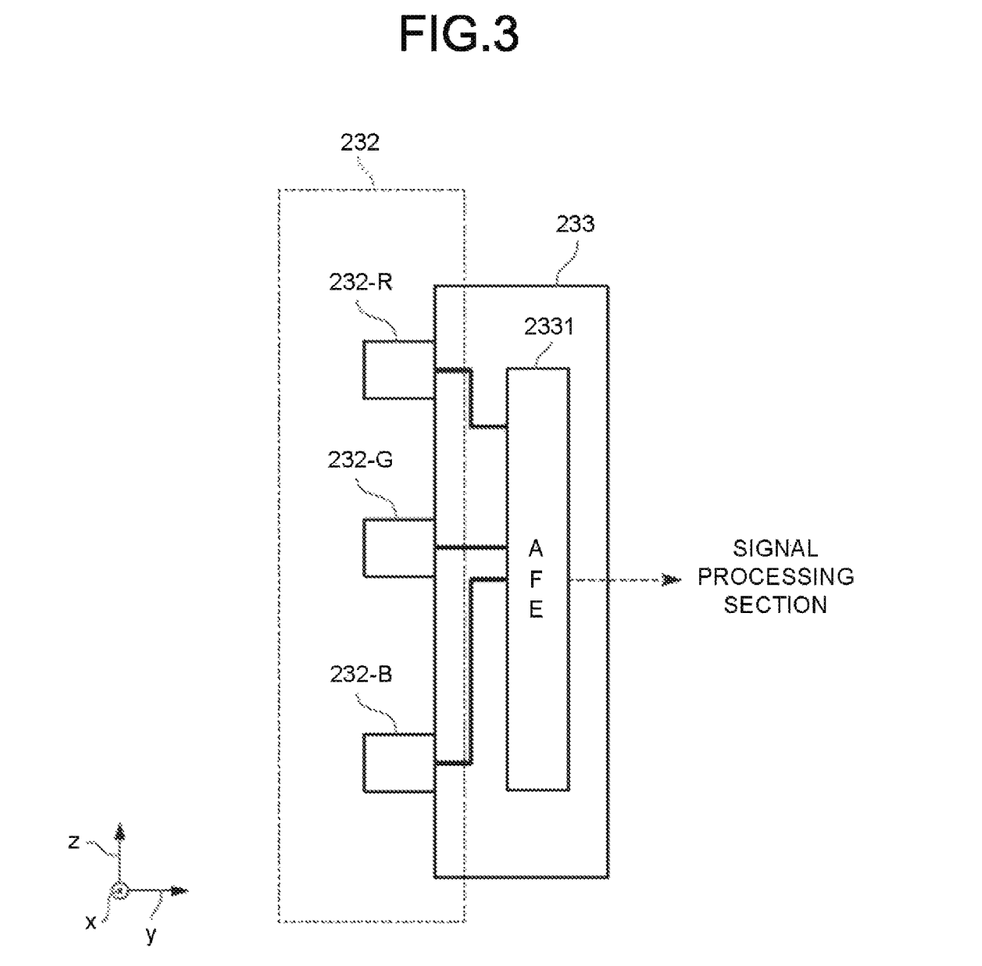
FIG. 3 is a diagram illustrating an example of hardware structures of a CCD sensor and a CCD substrate according to the embodiment.

FIG. 3 is a diagram illustrating an example of the hardware structures of the CCD sensor 232 and the CCD substrate 233 according to the embodiment.

The CCD sensor 232 includes three line sensors, i.e., a red line sensor 232-R, a green line sensor 232-G, and a blue line sensor 232-B. Each CCD of the red line sensor 232-R outputs an analog signal indicating the strength of the R (red) light in the light received thereby (hereinafter, referred to as "red analog signal"). Each CCD of the green line sensor 232-G outputs an analog signal indicating the strength of the G (green) light in the light received thereby (hereinafter, referred to as "green analog signal"). The blue line sensor 232-B outputs an analog signal indicating the strength of the B (blue) light in the light received thereby (hereinafter, referred to as "blue analog signal").

In place of the CCD, the line sensor may employ any type of solid-state image capturing element that generates electric charge from light received thereby. For example, the line sensor may employ a CMOS (Complementary metal-oxide-semiconductor) instead of the CCD.

The CCD substrate 233 includes an AFE circuit 2331. The AFE circuit 2331 acquires a red analog signal and converts it to a red digital signal. The AFE circuit 2331 acquires the green analog signal and converts it to a green digital signal. The AFE 2331 acquires the blue analog signal and converts it to a blue digital signal. Hereinafter, the red digital signal, the green digital signal, and the blue digital signal are referred to as a light strength digital signal if they are not distinguished.

Figure 4:
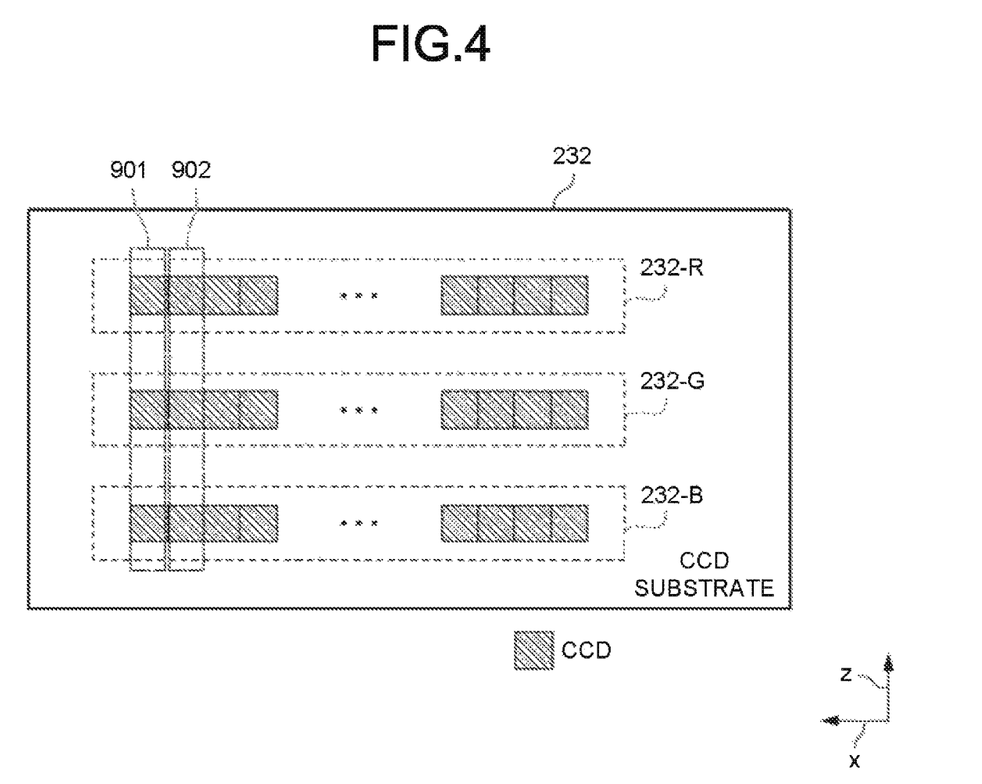
FIG. 4 is a diagram illustrating an example of a hardware structure as seen from the front of the CCD sensor according to the embodiment.

FIG. 4 is a diagram illustrating an example of the hardware structure as seen from the front of the CCD sensor 232 according to the embodiment. The CCD sensor 232 includes the red line sensor 232-R, the green line sensor 232-G, and the blue line sensor 232-B. Each CCD of a unit CCD group, which is made up of one CCD of the redline sensor 232-R, one CCD of the green line sensor 232-G and one CCD of the blue line sensor 232-B having the same X coordinate position, receives red reflected light, green reflected light, and blue reflected light respectively in the same unit operation. Specifically, in FIG. 4, three CCDs included in an area 901 constitute one unit CCD group. Also, the three CCDs existing in an area 902 constitute another unit CCD group. Below, the unit CCD group existing in the area 901 is referred to as unit CCD group 901, and the unit CCD group existing in the area 902 is referred to as unit CCD group 902. Each adjacent unit CCD group receives the light reflected by mutually adjacent reading positions in the main scanning direction. More specifically, the reading position on the sheet S reflecting the light received by the unit CCD group 901 is adjacent to the reading position on the sheet S that reflects the light received by the unit CCD group 902.

Returning to the description in FIG. 2. The operation controller 24 controls the first carriage 21, the second carriage 22 and the image capturing section 23. For example, the operation controller 24 controls the movement of the first carriage 21 and the lighting and extinction of the light source 211 of the first carriage 21. For example, the operation controller 24 controls the operations of the image capturing section 23.

The operation controller 24 controls the state of the image reading apparatus 100 to be either of a normal state and a low-power state. The normal state is a state in which the image reading apparatus 100 is capable of reading an image of an original document in response to the instruction of the user. In the normal state, a timing generator installed on the CCD substrate 233 outputs a CCD control signal to the CCD sensor 232. The low-power state is a state in which the image reading apparatus 100 is incapable of reading the image of the document in response to the instruction by the user, and thus power consumption in the low-power state is lower than that in the normal state. In the low-power state, the timing generator installed on the CCD substrate 233 stops. Thus, in the low-power state, the CCD control signal cannot be output. Thus, the operation of the CCD sensor 232 stops.

The first carriage 21 moves in the sub-scanning direction Y under the control of the operation controller 24. The second carriage 22 moves at a half speed in the same direction as the first carriage 21 along with the movement of the first carriage 21. Through such a movement, even if the first carriage 21 moves, an optical path length of the light reaching the imaging plane of the CCD sensor 232 does not vary. In other words, the optical path length of the light in an optical system composed of the first mirror 213, the second mirror 221, the third mirror 222 and the condenser lens 231 is constant. The optical path length from the placing surface 201a to the imaging plane of the CCD sensor 232 is thus constant For example, as shown in FIG. 2, the first carriage 21 moves from left to right along the sub-scanning direction Y at a constant speed. As the first carriage 21 moves in the sub-scanning direction Y, a reading position P of the sub-scanning direction of the sheet S moves as well. Thus, the reading position P of the sub-scanning direction moves from left to right along the sub-scanning direction Y. The reading position P of the sub-scanning direction is a position corresponding to one line of the main scanning direction X. Through the movement of the reading position P of the sub-scanning direction in the sub-scanning direction Y, images of the reading positions P of the sub-scanning direction of the sheet S are sequentially formed on the imaging plane of the CCD sensor 232. The CCD sensor 232 outputs a signal corresponding to the formed image at the reading position P as a signal corresponding to one line of the main scanning direction X. The CCD substrate 233 generates image data of the whole sheet S on the basis of signals corresponding to a plurality of lines.

The signal processing section 25 acquires the red digital signal, the green digital signal, and the blue digital signal output from the image capturing section 23 and outputs image data on which digital signal processing such as line-to-line correction is performed on the acquired signal.

Figure 5:
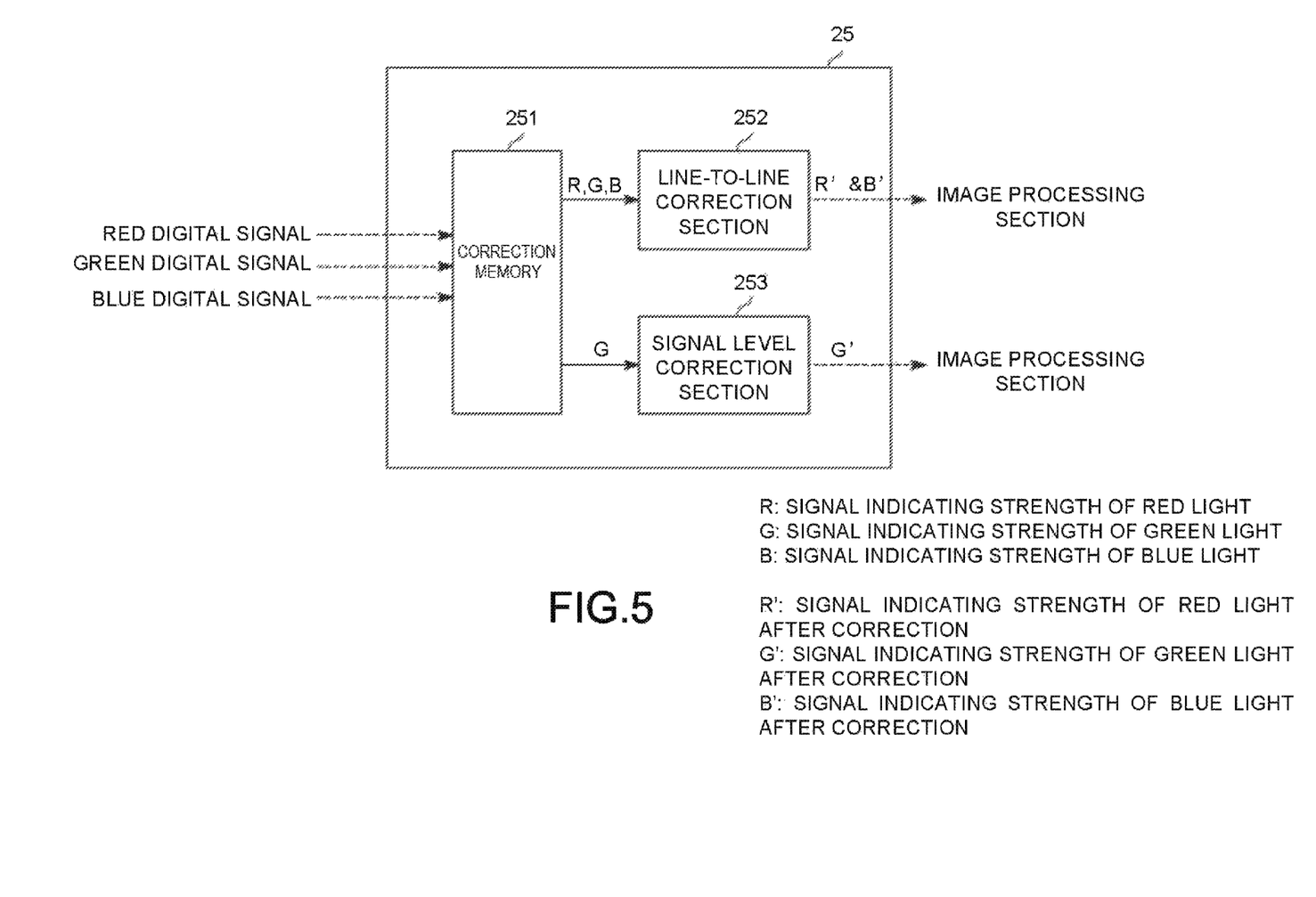
FIG. 5 is a diagram illustrating an example of functional components of a signal processing section according to the embodiment.

FIG. 5 is a diagram illustrating an example of the functional components of the signal processing section 25 according to the embodiment. The signal processing section 25 includes a processor (not shown) and a correction memory 251 connected by a bus line (not shown), and executes a program. The signal processing section 25 executes a program to implement a line-to-line correction section 252 and a signal level correction section 253. Alternatively, all or a part of functions of the signal processing section 25 may be realized by using hardware such as an ASIC (Application Specific Integrated Circuit), a PLD (Programmable Logic Device) or an FPGA (Field Programmable Gate Array). The program may be recorded in a computer-readable recording medium. The computer-readable recording medium is, for example, a portable medium such as a flexible disk, a magneto-optical disk, a ROM, a CD-ROM or the like, or a storage device such as a hard disk built in a computer system. The program may be transmitted via an electric communication line.

The correction memory 251 stores values indicating the strength of the light indicated by the light strength digital signal for each unit operation and unit CCD group. Hereinafter, information indicating the strength of the light indicated by the light strength digital signal for each unit CCD group is referred to as strength information.

Figure 6:
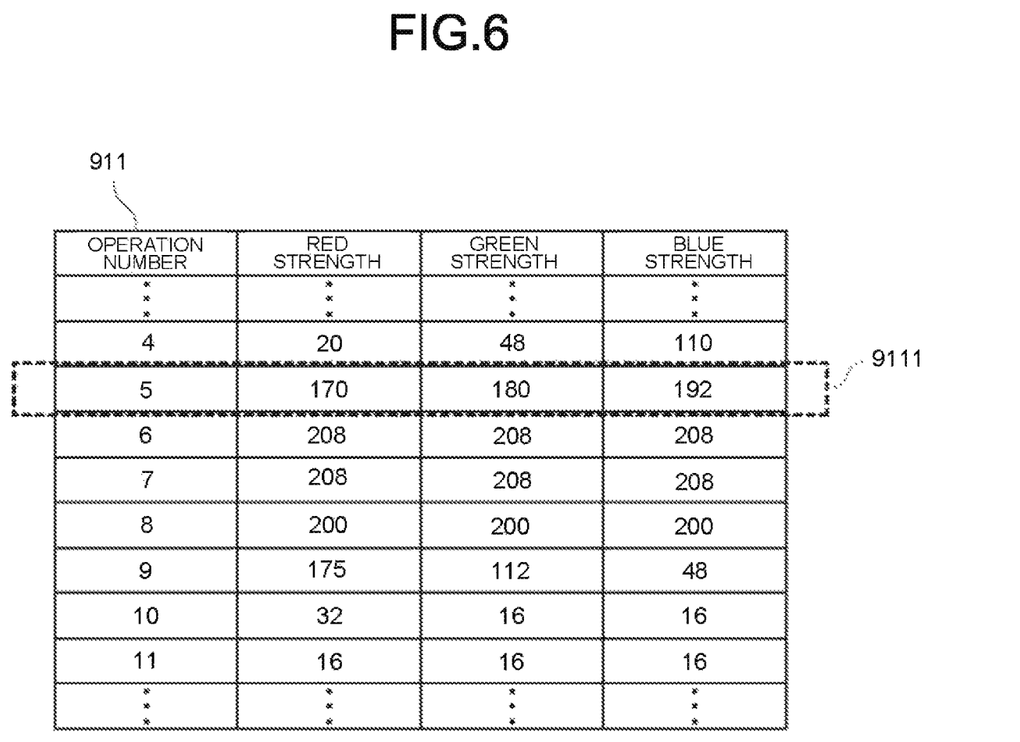
FIG. 6 is a diagram illustrating an example of strength information.

FIG. 6 is a diagram illustrating an example of the strength information according to the embodiment. For example, the strength information is stored in the correction memory 251 as a strength information table 911 shown in FIG. 6 for each CCD group. The correction memory 251 has a record for each operation number. Each record has an operation number and values of the red strength, the green strength and the blue strength. The operation number indicates the order of the unit operation. The operation number correlates with the reading position P of the sub-scanning direction on the sheet S. The value of the operation number is also the number of times the unit operation has been repeated from the start of the first unit operation in a certain reading operation until the unit operation in the order indicated by the operation number is completed. As described above, the time taken for one unit operation is always constant. Therefore, the value of the operation number is proportional to the time from the start of the first unit operation to the end of the unit operation of the operation number. In addition, the reading position P of the sub-scanning direction on the sheet S moves along with the movement of the light source 211. Since the light source 211 moves in the sub-scanning direction at a constant speed, the reading position P on the sheet S also moves on the sheet S in the sub-scanning direction at a constant speed. Therefore, the reading position P in the sub-scanning direction on the sheet S is proportional to the time with a time at which the light source 211 starts moving set as a time origin. The image reading apparatus 100 correlates the time at which the light source 211 starts moving and the time at which the unit operation starts since the light source 211 reads the sheet S by performing the movement and the unit operation.

Red strength has a value indicating the strength of the red reflected light acquired by the unit CCD group 901 in the unit operation in the order indicated by the operation number. Green strength has a value indicating the strength of the green reflected light acquired by the unit CCD group 901 in the unit operation in the order indicated by the operation number. Blue strength has a value indicating the strength of the blue reflected light acquired by the unit CCD group 901 in the unit operation in the order indicated by the operation number.

For example, a record 9111 indicates that the strength of the red reflected light, the green reflected light and the blue reflected light acquired by the unit CCD group 901 is 170, 180 and 192 in the fifth unit operation of the light source 211.

Each value of the strength information table 911 is indicated by 8 bits and stored in a memory area of the correction memory 251.

The values of the red strength, the green strength and the blue strength in the strength information table 911 are output to the line-to-line correction section 252 and the signal level correction section 253 in the order of the operation number. Hereinafter, a signal string indicating a series of red strength values output in order of the operation number is called a red signal string. A signal level of the red signal string indicates the red strength. Hereinafter, a signal string indicating a series of green strength values output to the line-to-line correction section 252 and the signal level correction section 253 in the order of operation number is called a green signal string. The value indicated by the signal level of the green signal string is the value indicated by the green strength. Hereinafter, a signal string indicating a series of blue strength values output to the line-to-line correction section 252 and the signal level correction section 253 in the order of the operation number is called a blue signal string. A signal level of the blue signal string indicates the blue strength.

Returning to the description in FIG. 5, the line-to-line correction section 252 corrects a phase difference among signal strings based on the red signal string, the green signal string and the blue signal string.

The phase difference in the present embodiment means a shift between waveforms of the signal strings. Correcting the phase difference in the present embodiment refers to reducing the shift.

The phase difference is caused by continuous movement in the sub-scanning line direction of the light source 211 even during the unit operation. Since the light source 211 continues to move during the unit operation, positions (hereinafter, referred to as "reflection positions") on the sheet from which the red light, the green light and the blue light emitted by the light source 211, are reflected are different for each color. Therefore, the phase difference occurs among the signal strings. Below, the phase difference is described in more detail.

If the image reading apparatus 100 reads the sheet S without moving the light source 211 in the unit operation, the light of the three colors emitted by the light source 211 in the unit operation are reflected at one reflection position on the sheet S. In that case, the image reading apparatus 100 reads one reflection position on the sheet S in one unit operation. The value of the red strength, the green strength or the blue strength in each record of the strength information table 911 indicates the strength of the light reflected at the same reflection position on the sheet S for each record. Therefore, since the image reading apparatus 100 reads a grayscale image, the strength indicated by the red strength, the green strength and the blue strength is substantially the same strength within the same record.

However, actually, in order to reduce the reading time, the image reading apparatus 100 reads the sheet S while moving the light source 211 even during the unit operation. The image reading apparatus 100 thus reads the sheet S based on light of the three colors being emitted onto different positions on the sheet S. The reflection positions of the light of the three colors are positions shifted according to the movement speed of the light source 211. The values of the red strength, the green strength and the blue strength in each record of the strength information table 911 indicate the strength of the light reflected at the reflection positions that are shifted from each other even within the same record. Therefore, the red strength, the green strength and the blue strength are shifted even within the same record. Due to the shift in the strength, a change method of the signal level along the operation number of the signal level varies among the signal strings. Therefore, the operation numbers having predetermined signal levels are different among the signal strings in some cases. The difference in the operation numbers among the signal strings is called the phase difference.

Since the reading position in the sub-scanning direction correlates with the operation number, the reflection position correlates to the operation number. Each signal string indicates the strength of each reflected light at each reflection position.

Figure 7:
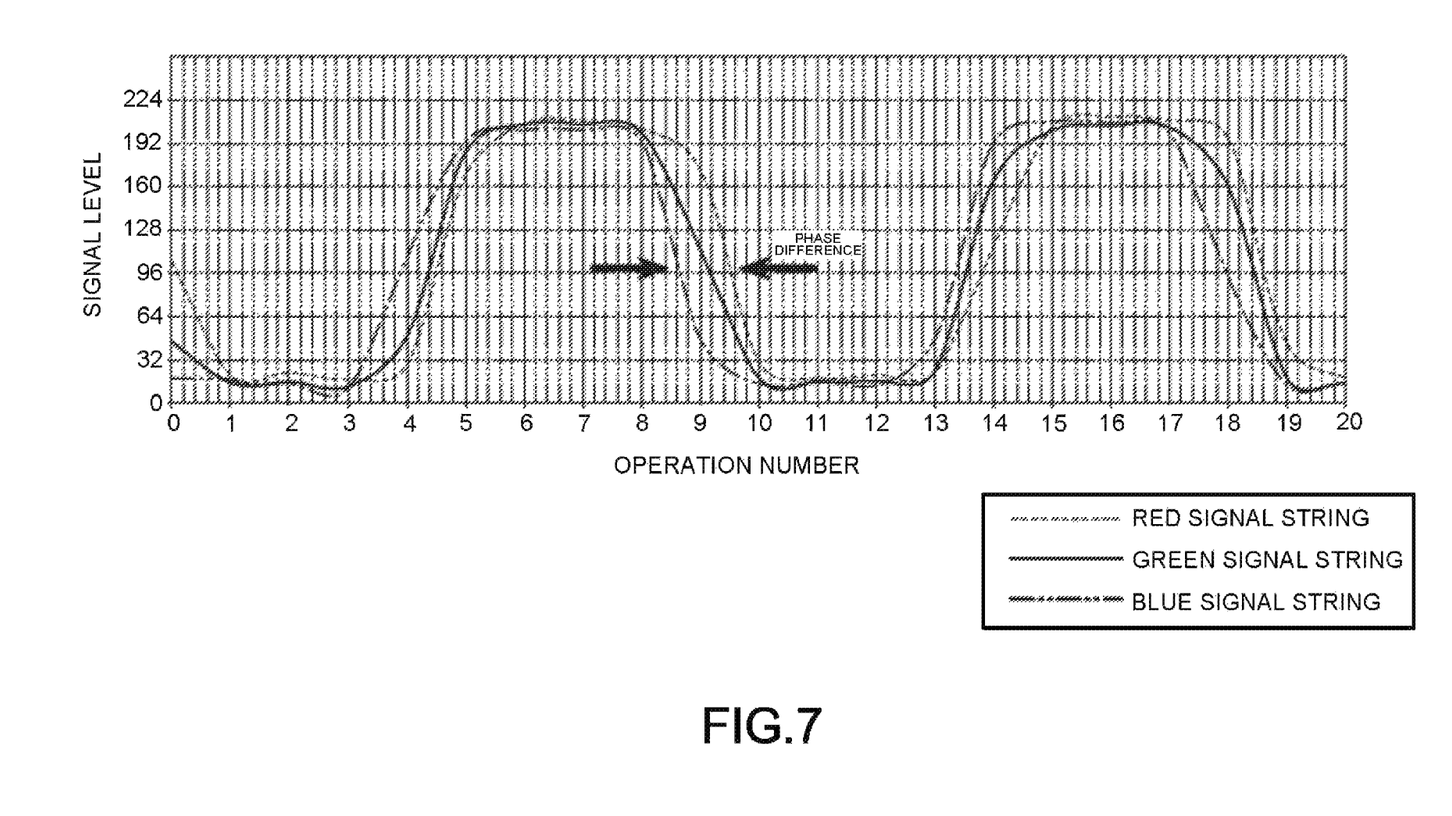
FIG. 7 is a diagram illustrating an example of a phase difference among signals of a red signal string, a blue signal string, and a green signal string.

FIG. 7 is a diagram illustrating an example of the phase difference among the signals of the red signal string, the blue signal string, and the green signal string according to the embodiment. In FIG. 7, the horizontal axis represents the operation number. The vertical axis represents the signal level of each signal string. As shown in FIG. 7, the change of the signal levels of the red signal string, the green signal string and the blue signal string is different. Therefore, there is the phase difference among the signal strings.

As described above, the light source 211 of the image reading apparatus 100 continues to move in the sub-scanning direction even in the unit operation, thereby generating the phase difference among the signal strings.

Returning to the description in FIG. 5, the line-to-line correction section 252 reduces the phase difference among the signal strings. Specifically, the line-to-line correction section 252 performs a line-to-line correction on the two signal strings of the three signal strings to reduce the phase difference with a reference signal string. The reference signal string is a signal string of the remaining one of the three signal strings, on which no line-to-line correction is executed. The reference signal string is a signal string predetermined to be not subjected to the line-to-line correction. The line-to-line correction is a processing to correct the signal level in each operation number of each signal string. The line-to-line correction is performed in the following manner: (1) a value obtained by multiplying the signal level at the preceding and succeeding operation numbers by the predetermined first and second correction coefficients is outputted; (2) a value obtained by multiplying its own value by a predetermined third correction coefficient is outputted; and (3) calculate the average value of (1) and (2).

Since the line-to-line correction is performed using the first to the third correction coefficients, the change in the signal level of the signal string occurs. Therefore, although the phase difference among the signal strings decreases due to the line-to-line correction by the line-to-line correction section 252, there is a case in which difference occurs in the signal level among the signal strings.

The line-to-line correction section 252 outputs the corrected signal string to an image processing section (not shown) provided in the image reading apparatus 100 at a rear stage. The image processing section (not shown) is realized by using hardware such as an ASIC, a PLD, an FPGA, or the like, and executes an image processing.

Figure 8:
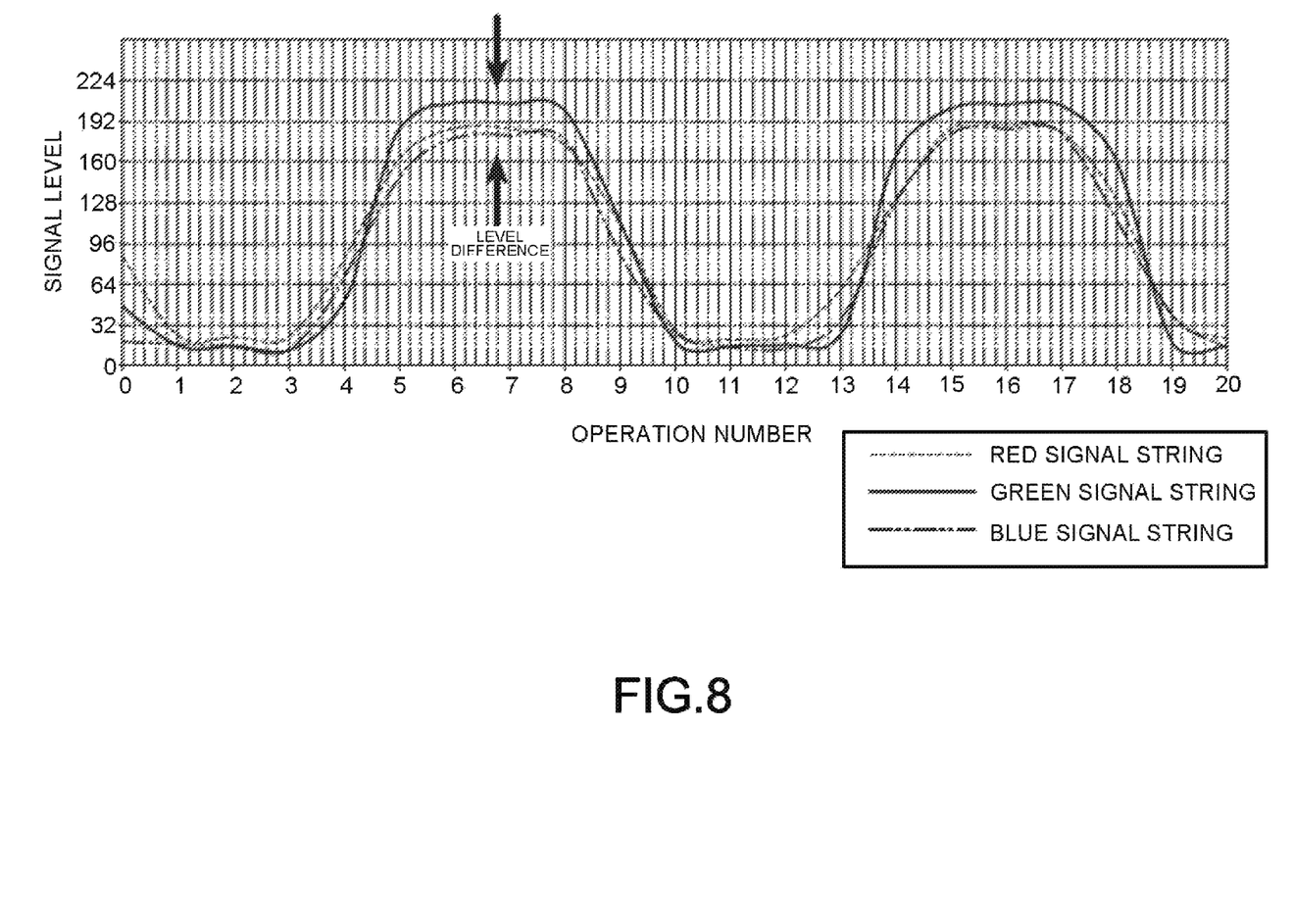
FIG. 8 is a diagram illustrating a line-to-line correction section that generates a signal level difference.

FIG. 8 is a diagram illustrating that the line-to-line correction section 252 generates the signal level difference according to the embodiment. FIG. 8 shows a signal string after the line-to-line correction section 252 performs the line-to-line correction for the red signal string and the blue signal string with the green signal string in FIG. 7 as the reference signal string. FIG. 8 shows a case in which the phase difference among the signal strings after the line-to-line correction is executed is smaller compared with that in FIG. 7. However, FIG. 8 shows a case in which the signal level difference among the signal strings occurs due to the line-to-line correction. More specifically, FIG. 8 shows a case in which the difference occurs between the signal levels of the red signal string and the blue signal string on which the line-to-line correction is performed and the signal level of the green signal string that is the reference signal string. The signal levels of the red signal string and the blue signal string subjected to the line-to-line correction processing are about the same.

Returning to the description in FIG. 5. The signal level correction section 253 corrects the signal level difference among the signal strings caused by line-to-line correction section 252. More specifically, the signal level correction section 253 corrects the signal level of the reference signal string by a predetermined value (hereinafter, referred to as a "level correction coefficient"). For example, by multiplying the signal level of the reference signal string by the predetermined level correction coefficient, the signal level of the reference signal string is corrected. The predetermined level correction coefficient may be any value as long as it can correct the signal level. For example, the level correction coefficient may be a predetermined value based on the reflected light at a predetermined position (hereinafter, referred to as "reference position") on a predetermined sheet (hereinafter, referred to as "reference sheet"). For example, the color of the reference position on the reference sheet may be any color as long as the reflectance for light of each color of RGB is substantially the same. For example, the color of the reference position on the reference sheet is a harmony color such as gray scale.

The signal level correction section 253 acts as a digital filter. The signal level correction section 253 corrects the signal level of the reference signal string based on the level correction coefficient which is a predetermined fixed value regardless of the result of the line-to-line correction by the line-to-line correction section 252. Therefore, the signal level correction section 253 does not necessarily correct the reference signal string after the line-to-line correction section 252 performs the correction. The signal level correction section 253 may correct the reference signal string in parallel with the line correction section 252. In the present embodiment, the signal level correction section 253 is corrected in parallel with the line-to-line correction section 252.

The line-to-line correction section 253 outputs the corrected signal string to the image processing section (not shown) provided in the image reading apparatus 100 at the rear stage.

Figure 9:
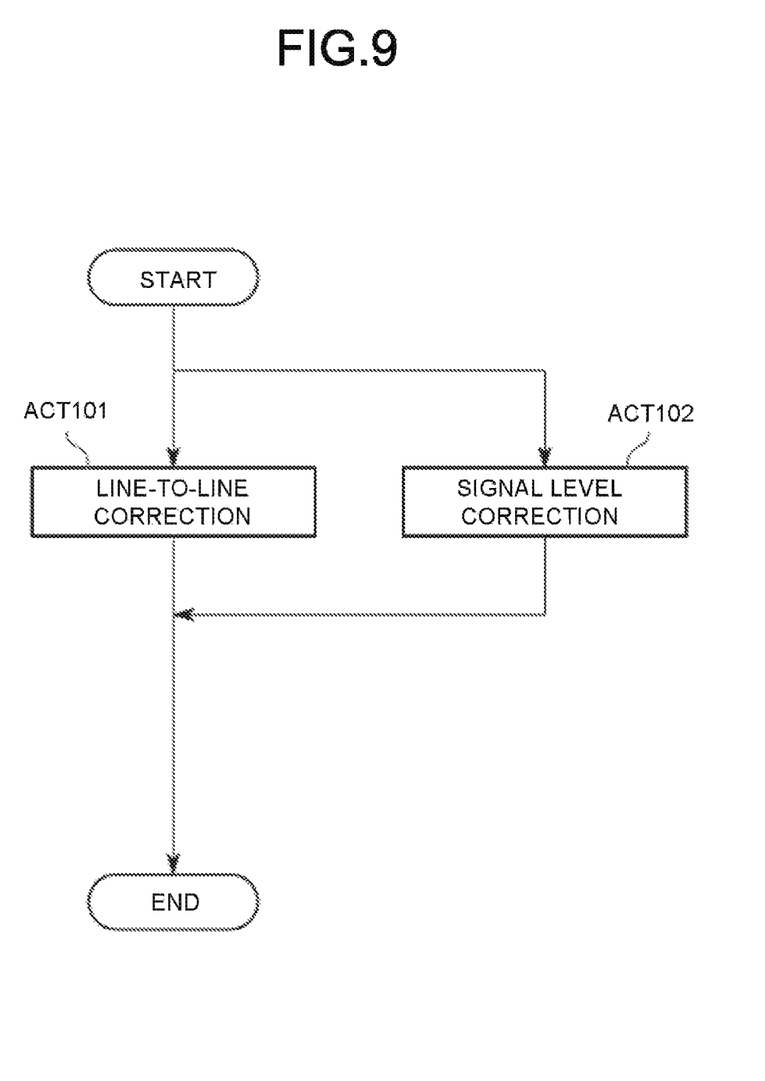
FIG. 9 is a flowchart illustrating an example of a process flow in which the image reading apparatus performs a correction among signal strings according to the embodiment.

FIG. 9 is a flowchart illustrating an example of a process flow in which the image reading apparatus 100 executes the correction among the signal strings according to the embodiment.

The image reading apparatus 100 corrects the phase difference among the signal strings by executing the line-to-line correction by the line-to-line correction section 252 (ACT 101). Specifically, the line-to-line correction section 252 performs correction with the green signal string as the reference signal string. More specifically, the line-to-line correction section 252 performs the line-to-line correction on the red signal string and the blue signal string so that the phase difference between the red signal string and the green signal string and the phase difference between the blue signal string and the green signal string are reduced.

The image reading apparatus 100 changes the signal level difference among the signals by the signal level correction section 253 in parallel with the processing in which the line-to-line correction section 252 performs the correction (ACT 102). Specifically, the signal level correction section 253 changes the signal level difference among the signal strings by multiplying the signal level of the green signal which is the reference signal string by the level correction coefficient which is a predetermined fixed value. As a result of the correction, the signal level of the corrected green signal string becomes substantially the same signal level as the red signal string and the blue signal string on which the line-to-line correction is performed.

The image reading apparatus 100 outputs the red signal string and the blue signal string corrected by the line-to-line correction section 252 and the green signal string corrected by the signal level correction section 253 to the image processing section (not shown) at the rear stage.

Figure 10:
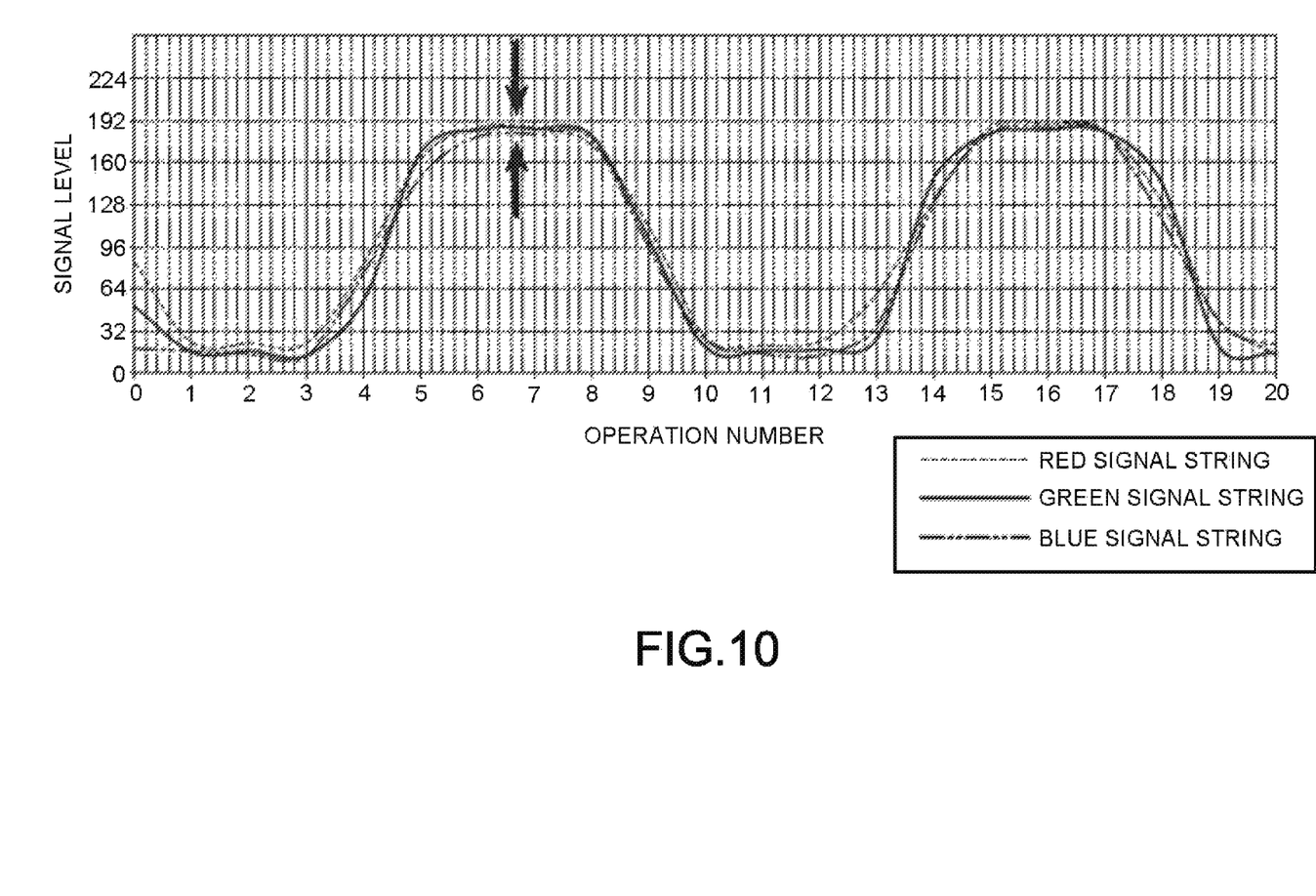
FIG. 10 is a diagram illustrating an example of each signal string after correction by the line-to-line correction section and the signal level correction section is executed according to the embodiment.

FIG. 10 is a diagram illustrating an example of each signal string after correction by the line-to-line correction section 252 or the signal level correction section 253 for each signal string in FIG. 7.

The phase difference and the signal level difference among the signals in FIG. 10 are smaller compared with the phase difference among the signal strings in FIG. 7 and the signal level difference among the signal strings in FIG. 8.

The image reading apparatus 100 of the embodiment configured in this way is provided with the signal level correction section 253, thereby making it possible to reduce the signal level difference among the signals generated by the line-to-line correction and suppress the change in color.

The light source 211 may emit the light in an order that is different from the order of red, blue and green. For example, the light source 211 may emit the light in the order of blue, green and red.

The reference signal string need not necessarily be the green signal string. The reference signal string may be the red signal string or the blue signal string. However, by setting the signal string corresponding to the color of the light emitted second among the light of the three colors sequentially emitted by the light source 211 as the reference signal string, it is possible to reduce the phase difference required to be subjected to the line-to-line correction. Therefore, by using the signal string corresponding to the color of the light emitted second among the light of the three colors sequentially emitted by the light source 211 as the reference signal string, the accuracy of the correction can be improved.

The line-to-line correction section 252 does not necessarily need to perform the line-to-line correction on only two signal strings other than the reference signal. The line-to-line correction section 252 may perform the line-to-line correction for all three signal strings. If the line-to-line correction section 252 performs the line-to-line correction for all three signal strings, the signal level correction section 253 performs the correction after correction by the line-to-line correction section 252. Furthermore, in this case, the signal level correction section 253 may correct two or more signal strings.

In addition, the line-to-line correction section 252 may perform the line-to-line correction only for one signal string.

In the embodiments described above, the signal level correction section 253 corrects only the reference signal string. In other embodiments, the signal level correction section 253 may correct all or a part of the signal strings corrected by the line-to-line correction section 252. In this case, the signal level correction section 253 carries out the correction on the signal string corrected by the line-to-line correction section 252 after the correction by the line-to-line correction section 252 is performed.

The signal processing section 25 does not need to be implemented as independent hardware. For example, the signal processing section 25 may be provided on the CCD substrate 233.

The image reading apparatus 100 may read an image on one side of the sheet or on both sides of the sheet.

The image reading apparatus 100 may read a color image in addition to the grayscale image. Also in that case, the signal level correction section 253 corrects the signal level of each signal string by multiplying the signal level of each signal string by the predetermined level correction coefficient.

The signal level correction section 253 may correct the signal level difference among the signal strings by addition or subtraction instead of by multiplication.

The number of AFE circuit 2331 is not necessarily one, and AFE circuits may be respectively provided for each sensor of the red line sensor 232-R, the green line sensor 232-G and the blue line sensor 232-B.

The CCD sensor 232 and the CCD substrate 233 are an example of an acquisition section. The red line sensor 232-R, the green line sensor 232-G and the blue line sensor 232-B are examples of first, second and third sensors, respectively. The red analog signal, the green analog signal and the blue analog signal are examples of first, second and third signals, respectively. The red signal string, the green signal string, and the blue signal string are examples of first, second and third signal strings, respectively. The line-to-line correction section 252 is an example of a first correction section. The signal level correction section 253 is an example of a second correction section. Furthermore, the level correction coefficient is an example of a parameter.

According to at least one embodiment described above, by including the signal level correction section 253, it is possible to reduce the signal level difference among the signals caused by the line-to-line correction and suppress the change in color.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image reading apparatus, comprising:
   a light source configured to repeatedly emit first light having a first color, second light having a second color different from the first color, and third light having a third color different from the first and second colors, at different times toward a read target while moving in a first direction;
   first, second, and third sensors, each configured to sense a strength of the first, second, and third lights, respectively, reflected from the read target, and to output first, second, and third signal waveforms, respectively, the first signal waveform corresponding to the strength of the first light sensed by the first sensor, the second signal waveform corresponding to the strength of the second light sensed by the second sensor, and the third signal waveform corresponding to the strength of the third light sensed by the third sensor; and
   a controller configured to execute a line-to-line correction for correcting a phase shift on the first and third signal waveforms, and to correct a shift in a signal level of the second signal waveform caused by the line-to-line correction.

2. The image reading apparatus according to claim 1, wherein the controller is configured to execute the line-to-line correction and correct the shift in the signal level, in parallel.

3. The image reading apparatus according to claim 1, wherein the controller is configured to correct the shift in the signal level after executing the line-to-line correction.

4. The image reading apparatus according to claim 1, wherein
   the first color, the second color, and the third color are red, green, and blue, respectively, and the first, second, and third sensors, are a red light sensor, a green light sensor, and a blue light sensor, respectively.

5. The image reading apparatus according to claim 1, wherein
   the first sensor, the second sensor, and the third sensor each include a plurality of solid-state image capturing elements arranged in a row along a second direction that is perpendicular to the first direction.

6. The image reading apparatus according to claim 1, wherein
   during a current light emission period, the first light is emitted a first time interval after the third light was emitted during a prior light emission period, the second light is emitted a second time interval after the first light is emitted, and the third light is emitted a third time interval after the second light is emitted, and
   the first, second, and third time intervals are all equal and a movement speed of the light source in the first direction is constant.

7. An image reading method, including:

repeatedly emitting first light having a first color, second light having a second color different from the first color, and third light having a third color different from the first and second colors, at different times toward a read target while moving a light emission source in a first direction;

acquiring first, second, and third signal waveforms corresponding to a strength of the first, second, and third lights, respectively, reflected from the read target;

executing a line-to-line correction for correcting a phase shift on the first and third signal waveforms, and correcting a shift in a signal level of the second signal waveform caused by the line-to-line correction.

8. The method according to claim 7, wherein the line-to-line correction is executed in parallel with the correction in the shift in the signal level.

9. The method according to claim 7, wherein the shift in the signal level is corrected after the line-to-line correction is executed.

10. The method according to claim 7, wherein the first color, the second color, and the third color are red, green, and blue, respectively, and the first, second, and third signal waveforms are acquired using a red light sensor, a green light sensor, and a blue light sensor, respectively.

11. The method according to claim 10, wherein the red light sensor, the green light sensor, and the blue light sensor each include a plurality of solid-state image capturing elements arranged in a row along a second direction that is perpendicular to the first direction.

12. The method according to claim 7, wherein during a current light emission period, the first light is emitted a first time interval after the third light was emitted during a prior light emission period, the second light is emitted a second time interval after the first light is emitted, and the third light is emitted a third time interval after the second light is emitted, and the first, second, and third time intervals are all equal and a movement speed of the light emission source in the first direction is constant.

* * * * *